US011092280B2

(12) United States Patent
Wu et al.

(10) Patent No.: US 11,092,280 B2
(45) Date of Patent: Aug. 17, 2021

(54) PORTABLE ELECTRONIC DEVICE

(71) Applicant: ASUSTeK COMPUTER INC., Taipei (TW)

(72) Inventors: Ya-Lin Wu, Taipei (TW); Shu-Chun Hsiao, Taipei (TW); Chia-Chang Tsui, Taipei (TW); Tsung-Ju Chiang, Taipei (TW); Ming-Hsing Yang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 16/846,422

(22) Filed: Apr. 13, 2020

(65) Prior Publication Data

US 2020/0240580 A1    Jul. 30, 2020

Related U.S. Application Data

(62) Division of application No. 15/144,838, filed on May 3, 2016, now Pat. No. 10,690,285.

(60) Provisional application No. 62/160,587, filed on May 12, 2015.

(30) Foreign Application Priority Data

Apr. 19, 2016  (TW) .................. 105112123

(51) Int. Cl.
*F16M 13/00*    (2006.01)
*G06F 1/16*    (2006.01)

(52) U.S. Cl.
CPC .......... *F16M 13/005* (2013.01); *G06F 1/166* (2013.01)

(58) Field of Classification Search
CPC .............................. G06F 1/166; F16M 13/005
See application file for complete search history.

(56) References Cited

U.S. PATENT DOCUMENTS

| | | | |
|---|---|---|---|
| 10,487,977 B2 * | 11/2019 | Lo .................. | F16M 13/005 |
| 10,690,285 B2 * | 6/2020 | Wu .................. | F16M 13/005 |
| 10,698,452 B2 * | 6/2020 | Fenton ............. | G06F 1/166 |
| 2007/0217135 A1 * | 9/2007 | Chuang ............ | G06F 1/1681 |
| | | | 361/679.05 |
| 2011/0074257 A1 * | 3/2011 | Li .................... | H04M 1/04 |
| | | | 312/223.1 |
| 2012/0275094 A1 * | 11/2012 | Zhou ............... | H04M 1/04 |
| | | | 361/679.01 |
| 2014/0097316 A1 * | 4/2014 | Hsu ................. | G06F 1/1681 |
| | | | 248/351 |
| 2016/0219735 A1 * | 7/2016 | Zhang ............. | F16M 11/10 |
| 2016/0273702 A1 * | 9/2016 | Shiba ............... | F16M 11/10 |

* cited by examiner

*Primary Examiner* — Robert J Hoffberg
(74) *Attorney, Agent, or Firm* — JCIPRNET

(57) ABSTRACT

A portable electronic device comprising a device body, a first linking member and a supporting member is provided. The first linking member includes a first end and a second end. The first end is rotatably connected to the device body. The supporting member is pivotally connected to the second end. The supporting member moves relative to the device body via the first linking member, the first linking member rotates relative to the device body via the first end, and then the second end moves close to or out from the device body.

5 Claims, 10 Drawing Sheets

PORTABLE ELECTRONIC DEVICE

CROSS-REFERENCE TO RELATED APPLICATION

This application is a divisional application of and claims the priority benefit of U.S. application Ser. No. 15/144,838, filed on May 3, 2016, now U.S. Pat. No. 10,690,285, which claims the priority benefits of U.S. provisional application Ser. No. 62/160,587, filed on May 12, 2015 and Taiwan application serial No. 105112123, filed on Apr. 19, 2016. The entirety of each of the above-mentioned patent applications are hereby incorporated by references herein and made a part of specification.

BACKGROUND OF THE INVENTION

Field of the Invention

The invention relates to an electronic device and, more specifically, to a portable electronic device.

Description of the Related Art

With the development of technology, electronic devices having user-friendly designs and high performances are launched. For example, a notebook computer gradually replaces a desktop computer and becomes the mainstream in the market. Additionally, portable electronic devices, such as a tablet computer and a smart phone, are popular in the market due to their convenient and advanced touch control interfaces and portable features.

Tablet computers are small in size and portable. A touch control screen of the tablet computer is configured as a main input unit which replaces a conventional keyboard and mouse. Furthermore, a handwriting recognizing module, a virtual keyboard or a speech recognizing module is also selectively built in the tablet computer for recognizing the information that users' input. Moreover, compared with a current notebook computer, a personal digital assistant (PDA) and a smart phone, a tablet computer is more attractive due to a large screen, while light in weight.

BRIEF SUMMARY OF THE INVENTION

According to an aspect, a portable electronic device is provided. The portable electronic device comprises a device body, a first linking member, and a supporting member. The first linking member includes a first end and a second end. The first end is rotatably connected to the device body. The supporting member is pivotally connected to the second end. The supporting member moves relative to the device body via the first linking member, the first linking member rotates relative to the device body via the first end, and then the second end moves close to or out from the device body.

In sum, with the configuration of the first linking member, the supporting member of the portable electronic device is movable relative to the device body. The first end of the first linking member is rotatably connected to the device body, thus the first linking member is rotatable relative to the device body. The second end of the first linking member is pivotally connected to the supporting member, thus the supporting member is rotatable relative to the first linking member. In this way, the supporting member of the portable electronic device is capable of moving rotatably relative to the device body via the first linking member. Since the second end of the first linking member can move out from or close to the device body due to rotational movement of the first linking member relative to the device body, the movement of the supporting member is free from the restriction of the device body. In other words, with the configuration of the first linking member, the degree of the freedom of the supporting member is higher. The supporting member is easy to expand out from or be received in the device body via a simple structure, which simplifies the manufacture or the assembly of the members.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
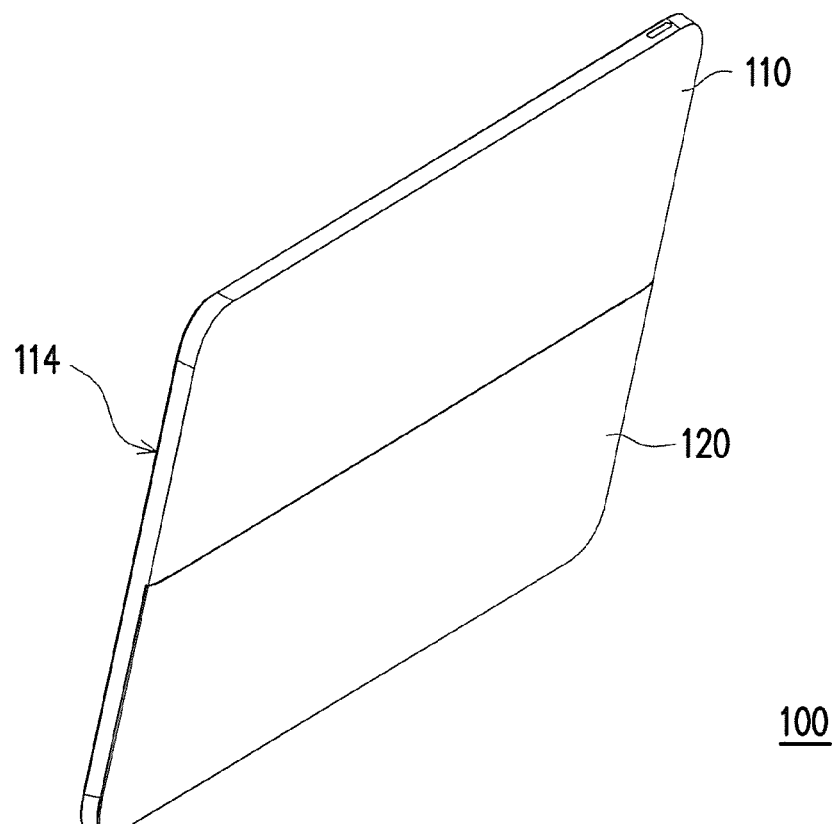
FIG. 1 and FIG. 2 are schematic diagrams showing a portable electronic device in different operating states in an embodiment.
Figure 2:
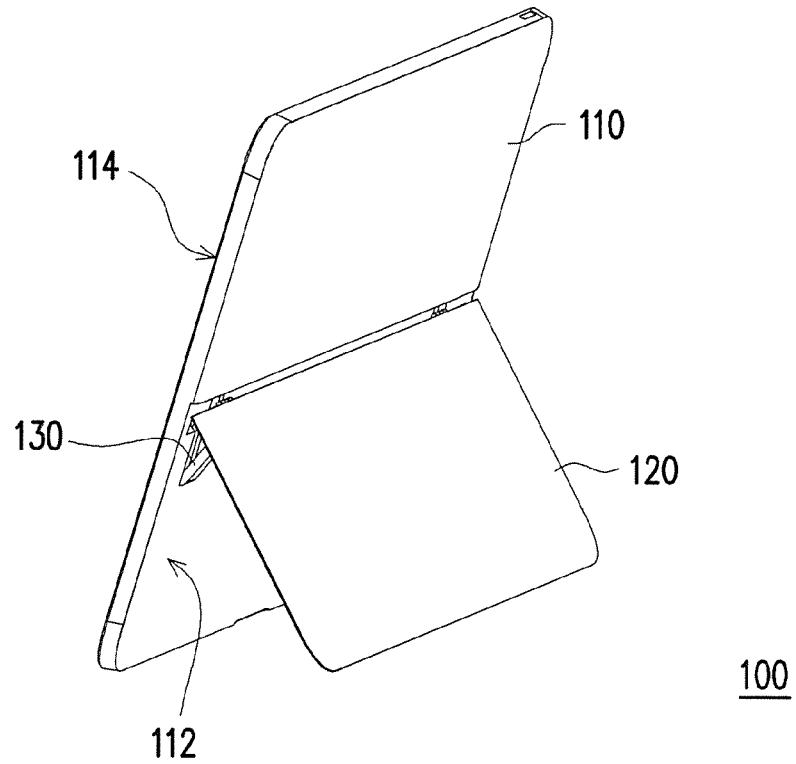
Figure 3:
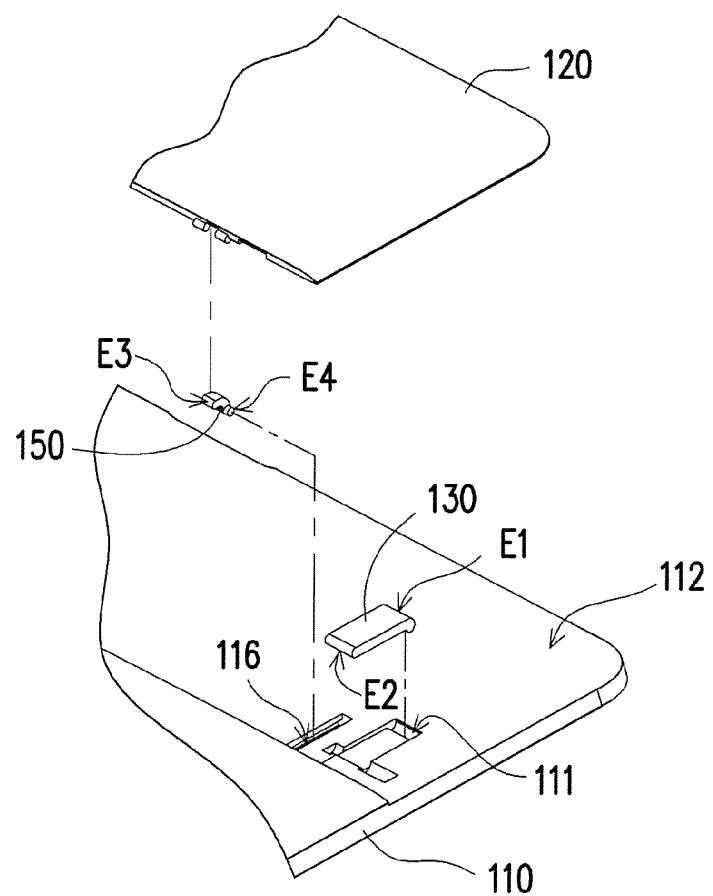
FIG. 3 and FIG. 4 are schematic diagrams showing some components of a portable electronic device in assembling viewed from different angles in an embodiment.
Figure 4:
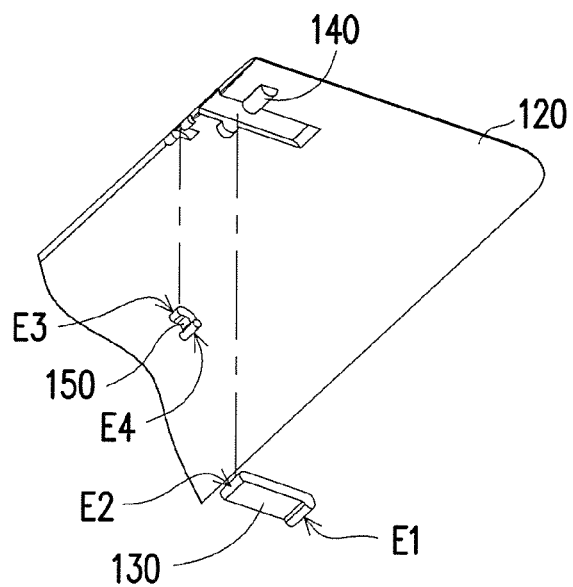

FIG. 1 and FIG. 2 are schematic diagrams showing a portable electronic device in different operating states in an embodiment. FIG. 3 and FIG. 4 are schematic diagrams showing some components of a portable electronic device in assembling viewed from different angles in an embodiment. Referring to FIG. 1 to FIG. 4, in an embodiment, a portable electronic device 100 is a tablet computer. The portable electronic device 100 includes a device body 110, a supporting member 120 and a first linking member 130. The device body 110 includes a display surface 114. The supporting member 120 is disposed at a side of the device body 110 opposite to the display surface 114.

In the embodiment, the device body 110 includes a receiving portion 112 at the side of the device body 110 opposite to the display surface 114 for receiving the supporting member 120 or allowing the supporting member 120 to expand out from the receiving portion 112 relative to the device body 110. As shown in FIG. 2, when the supporting member 120 rotates relative to the device body 110 to an expansion state, the portable electronic device 100 can stand on a plane via the supporting member 120. In an embodiment, an expansion angle between the supporting member 120 and the device body 110 is adjustable to reach an optimal view for watching the display surface 114. As shown in FIG. 1, in a closed state, the supporting member 120 is received in the receiving portion 112 and therefore the device body 110 has a flat appearance. As shown in FIG. 1, an outer surface of the supporting member 120 is flushed with the outer surface of the device body 110.

Referring to FIG. 3 and FIG. 4, in an embodiment, the first linking member 130 includes a first end E1 and a second end E2 opposite to each other. The first end E1 is rotatably connected to a recess structure 111 at the receiving portion 112 of the device body 110. The second end E2 is pivotally connected to the supporting member 120, thus, the supporting member 120 is rotatable relative to the first linking member 130. That is, the supporting member 120 is rotatable relative to the device body 110 via the first linking member 130 to be in different operating states, such as the expansion state or the closed state. As shown in FIG. 3 and FIG. 4, each of the device body 110 and the supporting member 120 includes a recess structure and the recess structures at the device body 110 and the supporting member 120 are corresponding to each other. When the supporting member 120 is received in the device body 110, the first linking member 130 is received in the recess structure 111.

In an embodiment, the portable electronic device 100 further includes a hinge 140. The hinge 140 is disposed at the supporting member 120 and connected to the second end E2 of the first linking member 130. The hinge 140 provides a twisting force for the relative rotation of the first linking member 130 and the supporting member 120. In other words, the supporting member 120 can be kept at any angle relative to the first linking member 130 due to the twisting force provided by the hinge 140. Therefore, the supporting member 120 is adjustable to be in a particular expansion state to provide a stable support.

Figure 5:
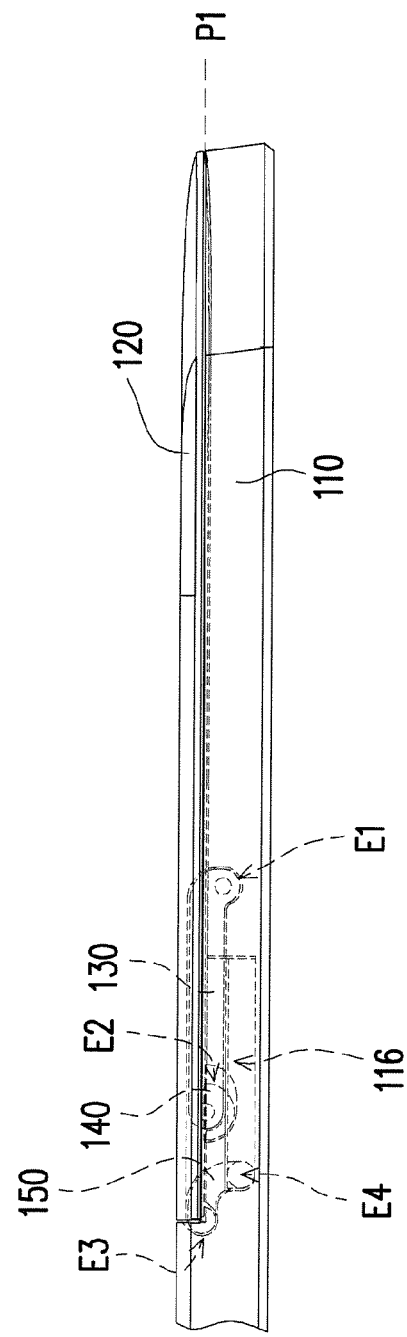
FIG. 5 to FIG. 8 are side views of a portable electronic device in different operating states in an embodiment.
Figure 6:
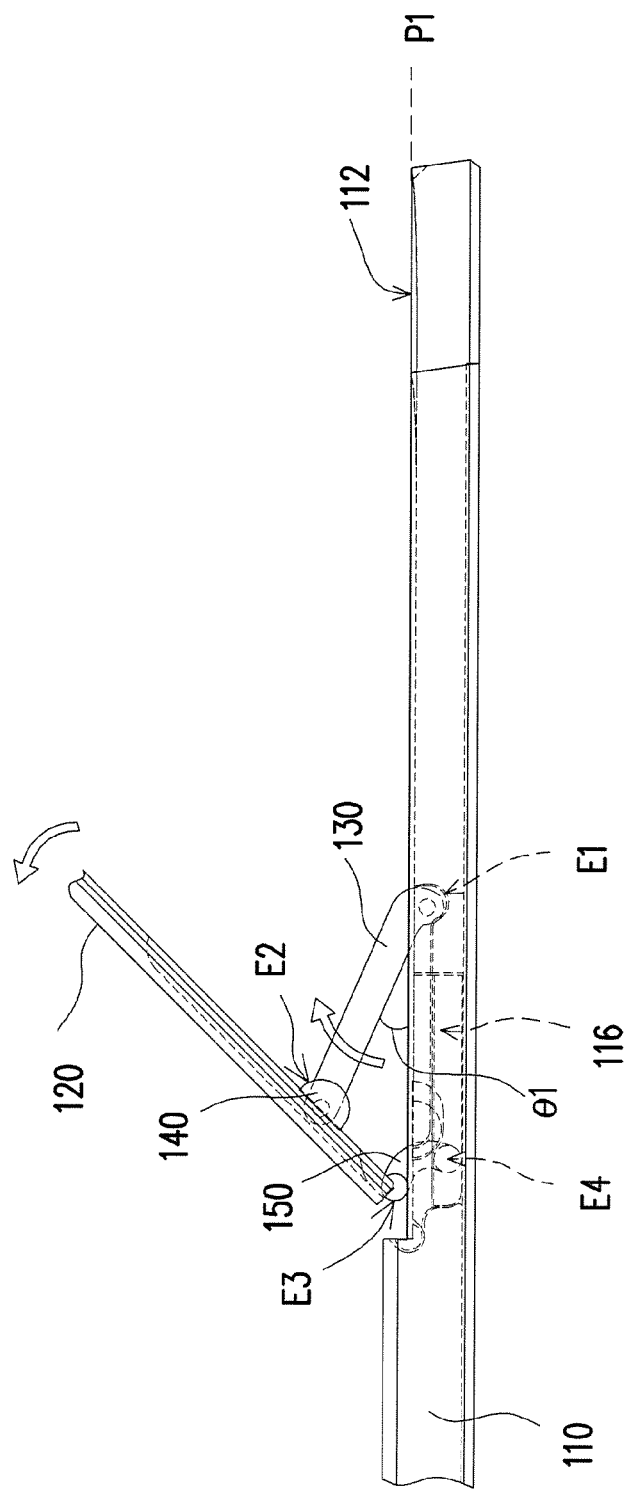
Figure 7:
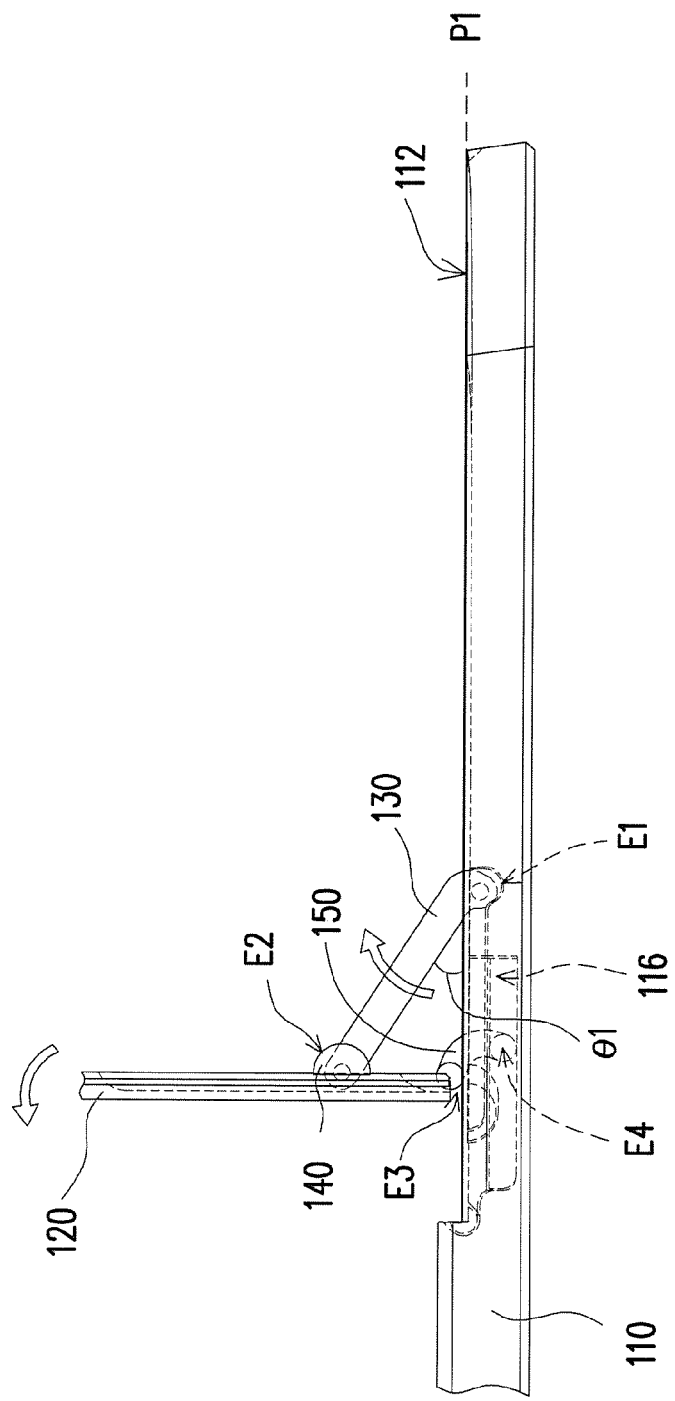
Figure 8:
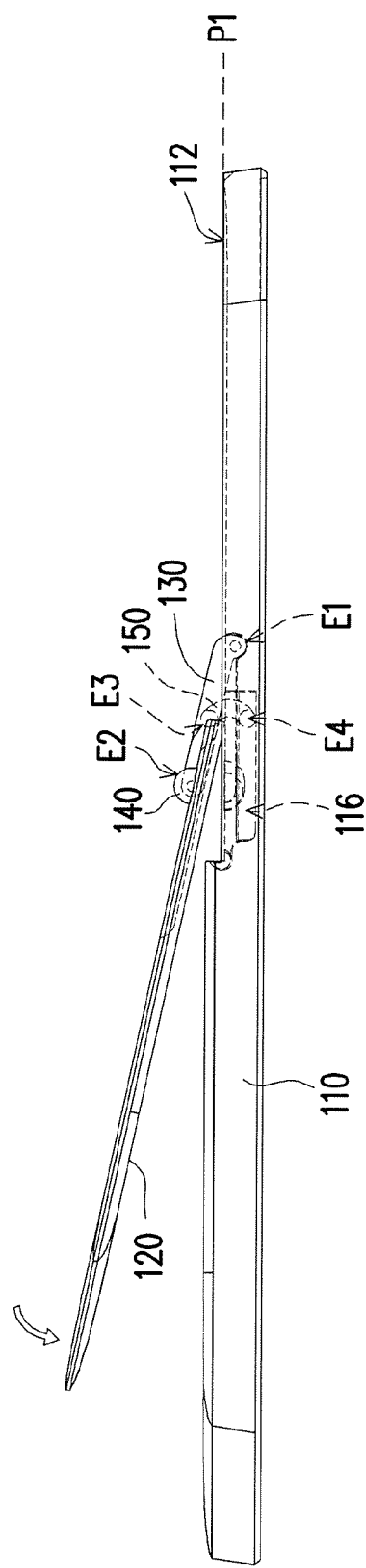

FIG. 5 to FIG. 8 are side views of a portable electronic device in different operating states in an embodiment. Referring to FIG. 5 to FIG. 8, in an embodiment, the second end E2 of the first linking member 130 moves out from the receiving portion 112 of the device body 110 (as shown in FIG. 6 to FIG. 8) or moves into the receiving portion 112 of the device body 110 (as shown in FIG. 5) when the first linking member 130 rotates relative to the device body 110. The second end E2 of the first linking member 130, which is pivotally connected to the supporting member 120 via the hinge 140, is suspended. Thus, the supporting member 120 is rotatable relative to a suspended pivot center (that is the second end E2). Conventionally, the pivot center of the supporting member is fixed to the device body. However, in the embodiment, the pivot center of the supporting member is suspended, thus the rotational movement of the supporting member 120 is free from the restriction of the device body 110. That is, the supporting member 120 is movable with no interaction with the device body. Therefore, the degree of freedom of the supporting member 120 is higher.

Referring to FIG. 3 and FIG. 4, in the embodiment, the portable electronic device 100 further includes a second linking member 150. The second linking member 150 includes a third end E3 and a fourth end E4. The third end E3 is pivotally connected to a side edge of the supporting member 120 (as shown in FIG. 4). The pivot portion of the supporting member 120 and the second end E2 of the first linking member 130 are adjacent to the side edge. In an embodiment, the first device body 110 further includes a first slot 116. The fourth end E4 of the second linking member 150 is rotatably and slidably connected to the first slot 116. The first slot 116 extends in a direction that is parallel to a contact plane P1 where the supporting member 120 is received in the device body 110.

Referring to FIG. 5 to FIG. 8, in the embodiment, the supporting member 120 is connected to the device body 110 via the second linking member 150, an angle θ1 between the first linking member 130 and the device body 110 is restricted when the first linking member 130 rotates relative to the device body 110. That is, a four-bar linkage is formed by the first linking member 130, the second linking member 150, the supporting member 120 and the device body 110, thus the angle θ1 is restricted in a range. The first linking member 130 rotates relative to the device body 110 within the particular angle range to avoid interaction between the supporting member 120 and the device body 110.

Figure 9:
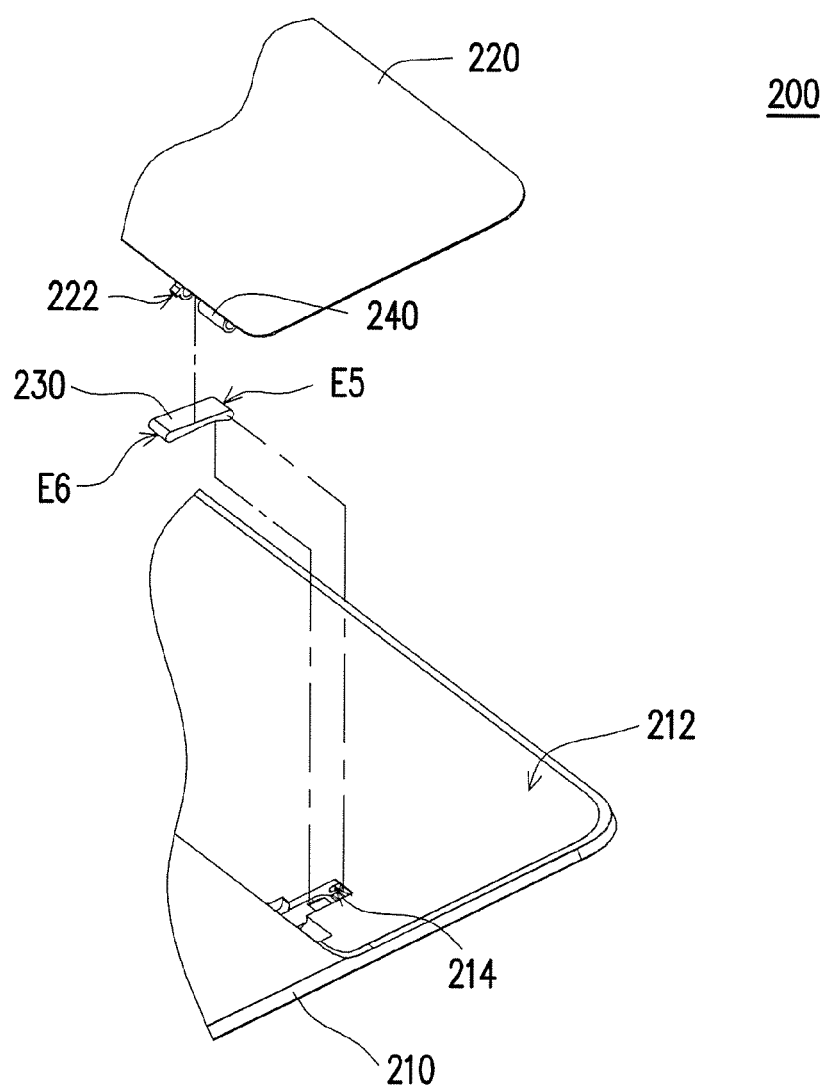
FIG. 9 and FIG. 10 are schematic diagrams showing some components of a portable electronic device are assembled in an embodiment.
Figure 10:
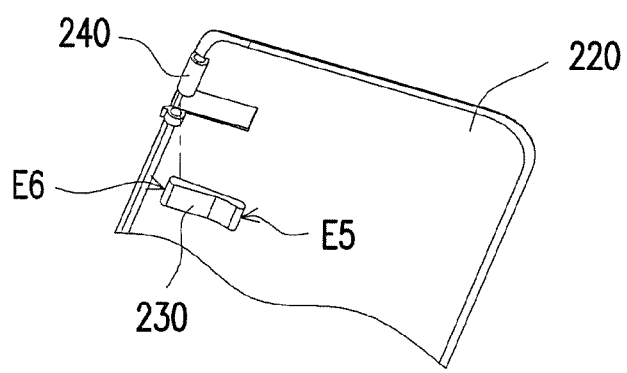
Figure 11:
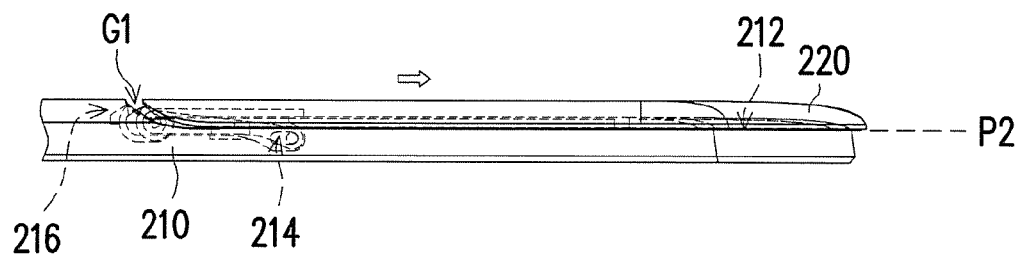
FIG. 11 to FIG. 13 are side views of a portable electronic device in different operating states in an embodiment.
Figure 12:
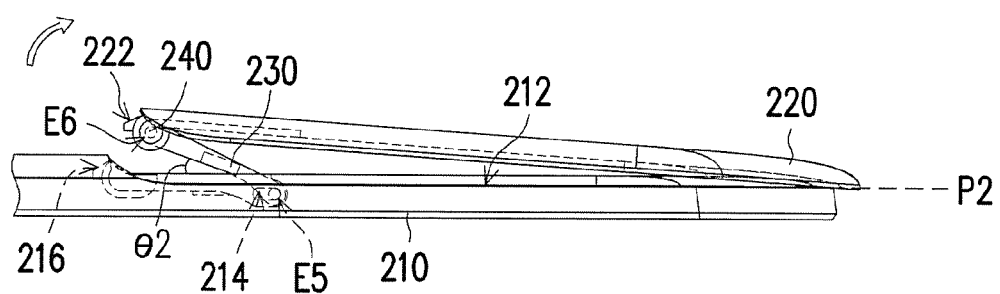
Figure 13:
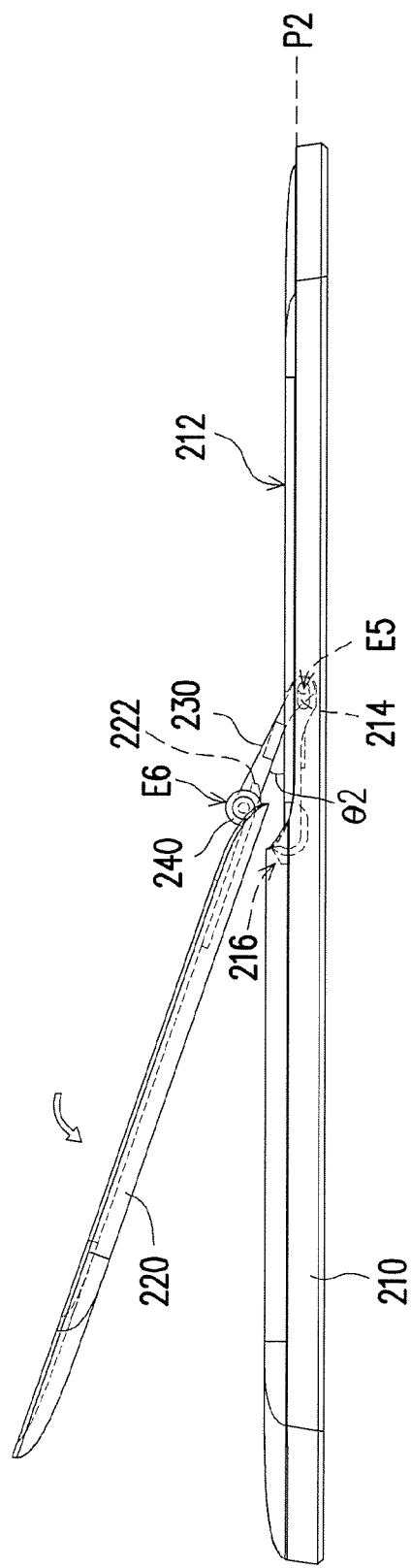

FIG. 9 and FIG. 10 are schematic diagrams showing some components of a portable electronic device are assembled in an embodiment. FIG. 11 to FIG. 13 are side views of a portable electronic device in different operating states. Referring to FIG. 9 and FIG. 10, in an embodiment, a portable electronic device 200 includes a device body 210, a supporting member 220, a first linking member 230 and a hinge 240, which are similar to those of the above embodiments. The first linking member 230 includes a first end E5 and a second end E6. The first end E5 is connected to the device body 210 and is rotatable. The second end E6 is pivotally connected to a side edge of the supporting member 220. The second end E6 is coaxially connected to the hinge 240. Thus, in the embodiment, the supporting member 220 has a similar suspended pivot center (the second end E6 of the first linking member 230) as that of the supporting member 120.

In the embodiment, the device body 210 includes a second slot 214. The second slot 214 extends along a direction that is parallel to a contact plane P2 where the supporting member 220 is received in the device body 210. The first end E5 of the first linking member 230 is movably and rotatably connected to the second slot 214. Thus, as shown in FIG. 11 and FIG. 12, if a user wants to move the supporting member 220 out from the receiving portion 212 of the device body 210, a force is applied to the supporting member 220 to make the supporting member 220 move along the contact plane P2. That is, the first linking member 230 slides along the second slot 214 via the first end E5 and a gap G1 is formed between the supporting member 220 and the device body 210. The first linking member 230 rotates relative to the device body 210, thus the second end E6 moves out from the receiving portion 212, and the supporting member 220 inclines relative to the contact plane P2. When the first linking member 230 rotates by a particular angle θ2 (in a clockwise direction), the supporting member 220 flips in a direction (in an anti-clockwise direction) opposite to the rotational direction of the first linking member 230, to reach a largest movement angle as shown in FIG. 13. Since the second end E6 is connected to the hinge 240, the supporting member 220 can be kept at a certain angle relative to the first linking member 230 during the rotation as shown in FIG. 11 to FIG. 13.

In an embodiment, the device body 210 further includes a concave portion 216. The concave portion is formed at a side wall of the receiving portion 212. The supporting member 220 further includes a protrusion 222 which is disposed at the side edge. When the supporting member 220 is received in the device body 210, the protrusion 222 is engaged with the concave portion 216, thus the supporting member 220 is received stably in the receiving portion 212 of the device body 210. In the embodiment, before the supporting member 220 rotates relative to the device body 210, the supporting member 220 translates as mentioned above (as shown in FIG. 11).

In an embodiment, a member for driving the first linking member 230 and the supporting member 220 to move upward relative to the device body 210 is a torsion spring (not shown). The torsion spring is configured at the first end E5. Thus, when the protrusion disengages from the concave portion 216, a twisting force of the torsion spring drives the first linking member 230. In an embodiment, a compression spring (not shown) is configured between the first linking member 230 and the device body 210. The compression deformation direction is perpendicular to the contact plane P2, thus, the first linking member 230 is driven to move upward relative to the device body 210.

In an embodiment (not shown in figures), a latch is configured. Accordingly, a button is configured at the device body 210 or the supporting member 220. When the button is pressed, the engagement between the supporting member 220 and the device body 210 are disengaged and the first linking member 230 is driven to move upward.

Figure 14:
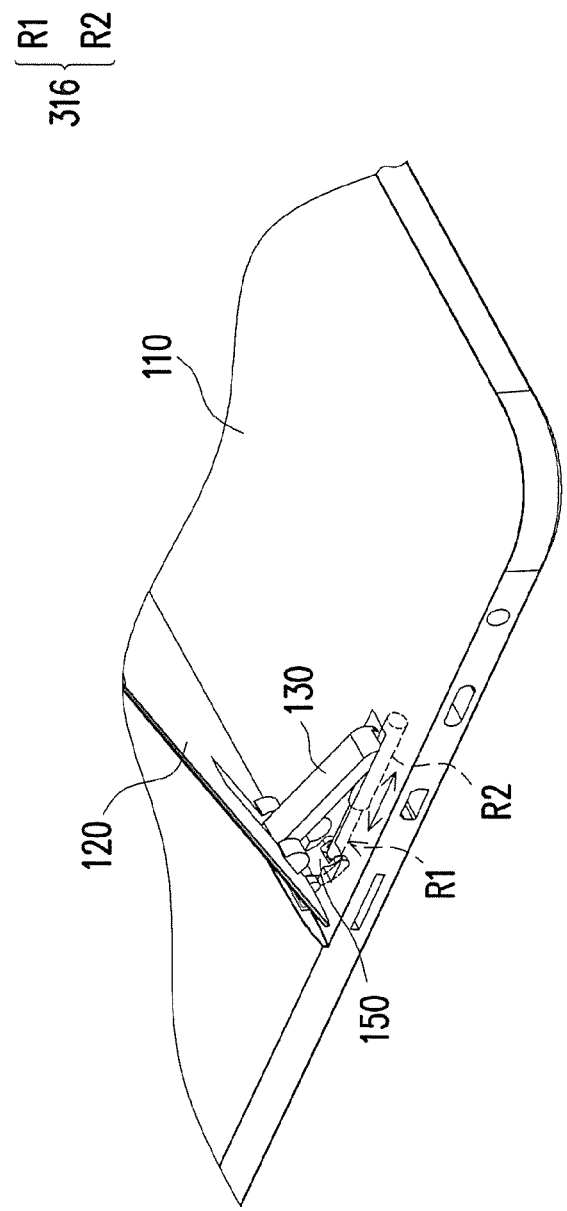
FIG. 14 is a schematic diagram showing partial of a portable electronic device in an embodiment.

FIG. 14 is a schematic diagram showing partial of a portable electronic device in an embodiment. Referring to FIG. 14, in an embodiment, the second linking member 150 is driven by a hydraulic rod 316, which is different from the embodiments of FIG. 3 to FIG. 8. The hydraulic rod 316 is configured at the device body 110. The hydraulic rod 316 includes a fixing portion R2 and a moving portion R1. The fixing portion R2 is fixed inside the device body 110. The moving portion R1 moves axially relative to the fixing portion R2 (as indicated by a double-headed arrow in FIG. 14). An end of the first linking member 130 is connected pivotally to the device body 110 and located above the hydraulic rod 316. The second linking member 150 is connected rotatably to the moving portion R1 of the hydraulic rod 316. The second linking member 150 is driven by the hydraulic rod 316 to traverse along an axial direction parallel to the contact plane P1 (as shown hereinbefore). In this way, the second linking member 150 is driven to move upward relative to the device body 210.

In sum, the supporting member of the portable electronic device is pivotally connected to one end of the first linking member, and the other end of the first linking member is movably connected to the device body. Thus, the pivot center of the supporting member and the first linking member can move out from/into the receiving portion of the device body with the movement of the first linking member. Since the pivot center is not directly fixed to the device body, the degree of freedom of the supporting member 120 is higher, and interaction between the supporting member and the device body during the relative movement is avoided.

In the embodiment, the second linking member is further connected between the supporting member and the device body to form a four-bar four bar linkage, thus the first linking member and the supporting member moves within a desired range. In another embodiment, the first linking member is rotatably and slidably connected to the device body, thus, before the first linking member and the supporting member rotates, the supporting member and the first linking member translate along the contact plane where the supporting member is received in the device body.

In the embodiments, the pivot center of the first linking member and the supporting member is movable, which facilitates the supporting member to move with no interaction with the device body and simplifies the connection between the supporting member and the device body.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A portable electronic device comprising:
   a device body including a slot;
   a linking member including a first end and a second end, wherein the first end is slidably and rotatably connected to the slot of the device body; and
   a supporting member pivotally connected to the second end, wherein the supporting member moves relative to the device body via the linking member, when the linking member rotates relative to the device body via the first end, the second end moves toward or out from the device body, the supporting member slides relative to the device body along with the linking member.

2. The portable electronic device according to claim 1, further comprising a hinge disposed at the supporting member and connected to the second end, to provide a torque for relative rotation of the linking member and the supporting member, so that the supporting member can be kept at any angle relative to the linking member.

3. The portable electronic device according to claim 1, wherein the device body includes a receiving portion, when the supporting member is received in the receiving portion, an outer surface of the supporting member is flushed with an outer surface of the device body.

4. The portable electronic device according to claim 1, wherein the slot extends in a direction that is parallel to a contact plane where the supporting member is received in the device body.

5. The portable electronic device according to claim 1, wherein the device body includes a concave portion, the supporting member further includes a protrusion, when the supporting member is received in the device body, the protrusion is engaged with the concave portion.

* * * * *